US012810329B2

(12) United States Patent
Singh et al.

(10) Patent No.: US 12,810,329 B2
(45) Date of Patent: Nov. 24, 2026

(54) METHODS AND SYSTEMS FOR ENHANCING USER IDENTIFICATION USING TRANSACTION INFORMATION

(71) Applicant: MASTERCARD INTERNATIONAL INCORPORATED, Purchase, NY (US)

(72) Inventors: Alok Singh, Gurgaon (IN); Anil Kumar Surisetty, Visakhapatnam (IN); Rakshit Rao, Mahendergarh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/752,736

(22) Filed: Jun. 24, 2024

(65) Prior Publication Data

US 2025/0390918 A1 Dec. 25, 2025

(51) Int. Cl.

*G06Q 30/0273* (2023.01)
*G06F 21/31* (2013.01)
*G06Q 30/0251* (2023.01)
*H04L 67/306* (2022.01)

(52) U.S. Cl.

CPC ......... *G06Q 30/0275* (2013.01); *G06F 21/31* (2013.01); *G06Q 30/0251* (2013.01); *H04L 67/306* (2013.01)

(58) Field of Classification Search

CPC .......... G06Q 30/02–0277; G06F 21/31; H04L 67/306

See application file for complete search history.

(56) References Cited

U.S. PATENT DOCUMENTS 11,501,310 B1 * 11/2022 Krausz ................. G06Q 20/401

FOREIGN PATENT DOCUMENTS

WO WO-2023027325 A1 * 3/2023 ............. G06Q 30/06

OTHER PUBLICATIONS

Wikepedia, Psychographic, Internet Archive Capture Date Apr. 10, 2012, Internet Archive Way Back Machine. (Year: 2012).*

* cited by examiner

*Primary Examiner* — Raquel Alvarez

(74) *Attorney, Agent, or Firm* — Barta Jones, PLLC

(57) ABSTRACT

Methods and systems for enhancing user identification using transaction information are disclosed. The method performed by a server system includes receiving user registration request including a first user identifier (ID) and advertisement-linked transaction information from a Demand Side Platform (DSP). Method includes accessing historical transaction dataset including transaction-related information and identifying a user from a plurality of users based on the advertisement-linked transaction information and the historical transaction dataset. Method includes linking the user with the first user ID and receiving a new user registration including a second user ID and advertisement-linked second transaction information request from DSP. Method includes checking if the new user registration request is associated with an existing user based on the advertisement-linked second transaction information and the historical transaction dataset. Upon determining that the existing user is the user, facilitating transmission of an existing user response message including the first user ID to the DSP.

20 Claims, 9 Drawing Sheets

METHODS AND SYSTEMS FOR ENHANCING USER IDENTIFICATION USING TRANSACTION INFORMATION

TECHNICAL FIELD

The present disclosure relates to advertisement bidding and delivery mechanisms and, more particularly, to electronic methods and complex processing systems for enhancing user identification using transaction information by a demand side platform.

BACKGROUND

Consumer attraction has always been a key goal of merchants. Conventionally, targeted advertisements (Ads) have been used by merchants to attract consumers or users to their stores or websites. In the digital world, merchants must compete for user attention using targeted online advertising. The most prominent technique for buying and selling digital Ad inventory is known as real-time bidding (RTB). RTB allows for highly targeted and efficient ad placements on different locations within various websites that a plurality of users visit. The RTB ecosystem includes a Supply Side Platform (SSP), an Ad exchange platform (AEP), and a Demand Side Platform (DSP).

Within the RTB ecosystem, the SSP is used by a publisher to manage and sell their ad inventory programmatically. Here, the publisher refers to a webpage or mobile application (app) that has available Ad space/slots and wishes to place Ads for merchants there to generate revenue. The goal of the SSP is to enable publishers to connect with multiple Ad exchanges and demand sources, to maximize the value of their Ad inventory. For instance, when a user visits a webpage or mobile app, the SSP sends bid requests to multiple DSPs, initiating the RTB auction process. The AEP serves as a marketplace for buying and selling Ad impressions through auctions. For instance, when a user visits a webpage or mobile app containing an Ad space, an Ad request is sent to the AEP. The AEP then conducts a real-time auction to determine which advertiser's ad should be displayed in the available Ad space. The DSP is used by advertisers to participate in RTB auctions and bid on Ad impressions. Here, the advertiser refers to an entity that is responsible for handling an Ad campaign for the merchant interested in advertising their goods, products, and/or services. DSP allows advertisers to target specific audience segments, set bidding parameters, and optimize their ad campaigns in real-time. Further, a DSP can help advertisers in tailoring their bidding strategies to reach their desired audience effectively by leveraging crucial user-related information such as user demographics data, browsing history data, context data, and so on. During the RTB auction, advertisers submit bids for the ad impression based on various user-related information provided by the DSP. The highest bidder wins the auction, and their Ad is dynamically served to the user's device in real-time. This dynamic Ad targeting can help ensure that Ads are delivered to the most relevant audience segments, maximizing the effectiveness of advertising campaigns.

Conventionally, DSPs track the user-related information using the Internet Protocol (IP) address of the user along with cookies. Here, cookies refer to small data files that catalog or track the behavior of all users on one or more websites. As may be understood, user-related information allows advertisers to profile their target users with unprecedented accuracy. Therefore, it is crucial for DSPs to maintain and continuously update this user-related information based on the activities of the users. However, it has been observed that DSPs often lose the ability to identify an existing user in their database when the cookies are either deleted or reset by the user manually or automatically. Similarly, the DSPs may also fail to identify an existing user in their database when the IP address associated with the user changes. This may occur quite often if the user has subscribed to a dynamic IP with their Internet Service Provider (ISP). This inability of the DSPs to identify existing users results in improper segmentation of users and eventually results in sub-optimal bidding strategies and less effective Ad placements.

To that end, there exists a need for technical solutions such as methods and systems for enhancing user identification for accurately identifying and segmenting users within DSPs, ultimately improving the efficiency and effectiveness of digital advertising campaigns, thereby overcoming the aforementioned technical drawbacks.

SUMMARY

Various embodiments of the present disclosure provide methods and systems for enhancing user identification using transaction information for a Demand Side Platform (DSP) within a real-time advertisement bidding system.

In an embodiment, a computer-implemented method for enhancing user identification using transaction information is disclosed. The computer-implemented method performed by a server system includes receiving a user registration request from a Demand Side Platform (DSP). The user registration request includes at least a first user identifier (ID) and advertisement-linked transaction information. The computer-implemented method further includes accessing a historical transaction dataset from a database associated with the server system. The historical transaction dataset includes at least transaction-related information associated with a plurality of transactions performed by a plurality of users. The computer-implemented method further includes identifying a user from the plurality of users based, at least in part, on the advertisement-linked transaction information and the historical transaction dataset. The computer-implemented method further includes linking the user with the first user ID. The computer-implemented method further includes receiving a new user registration request from the DSP. The new user registration request includes at least a second user ID and advertisement-linked second transaction information. The computer-implemented method further includes checking if the new user registration request is associated with an existing user from the plurality of users based, at least in part, on the advertisement-linked second transaction information and the historical transaction dataset. Herein, the existing user is the user that is already linked with the first user ID. Upon determining that the existing user is the user, the computer-implemented method further includes facilitating the transmission of an existing user response message to the DSP. The existing user response message includes at least the first user ID of the user.

In another embodiment, a server system is disclosed. The server system includes a communication interface and a memory including executable instructions. The server system also includes a processor communicably coupled to the memory. The processor is configured to execute the instructions to cause the server system, at least in part, to receive a user registration request from a Demand Side Platform (DSP). The user registration request includes at least a first user identifier (ID) and advertisement-linked transaction information. The server system is further caused to access a historical transaction dataset from a database associated with the server system. The historical transaction dataset includes at least transaction-related information associated with a plurality of transactions performed by a plurality of users. The server system is further caused to identify a user from the plurality of users based, at least in part, on the advertisement-linked transaction information and the historical transaction dataset. The server system is further caused to link the user with the first user ID. The server system is further caused to receive a new user registration request from the DSP. The new user registration request includes at least a second user ID and advertisement-linked second transaction information. The server system is further caused to check if the new user registration request is associated with an existing user from the plurality of users based, at least in part, on the advertisement-linked second transaction information and the historical transaction dataset. Herein, the existing user is the user that is already linked with the first user ID. Upon determining that the existing user is the user, the server system is further caused to facilitate the transmission of an existing user response message to the DSP. The existing user response message includes at least the first user ID of the user.

In yet another embodiment, a non-transitory computer-readable storage medium is disclosed. The non-transitory computer-readable storage medium includes computer-executable instructions that, when executed by at least a processor of a server system, cause the server system to perform a method. The method includes receiving a user registration request from a Demand Side Platform (DSP). The user registration request includes at least a first user identifier (ID) and advertisement-linked transaction information. The method further includes accessing a historical transaction dataset from a database associated with the server system. The historical transaction dataset includes at least transaction-related information associated with a plurality of transactions performed by a plurality of users. The method further includes identifying a user from the plurality of users based, at least in part, on the advertisement-linked transaction information and the historical transaction dataset. The method further includes linking the user with the first user ID. The method further includes receiving a new user registration request from the DSP. The new user registration request includes at least a second user ID and advertisement-linked second transaction information. The method further includes checking if the new user registration request is associated with an existing user from the plurality of users based, at least in part, on the advertisement-linked second transaction information and the historical transaction dataset. Herein, the existing user is the user that is already linked with the first user ID. Upon determining that the existing user is the user, the method further includes facilitating the transmission of an existing user response message to the DSP. The existing user response message includes at least the first user ID of the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present technology, reference is now made to the following descriptions taken in connection with the accompanying drawings in which.

Figure 1:
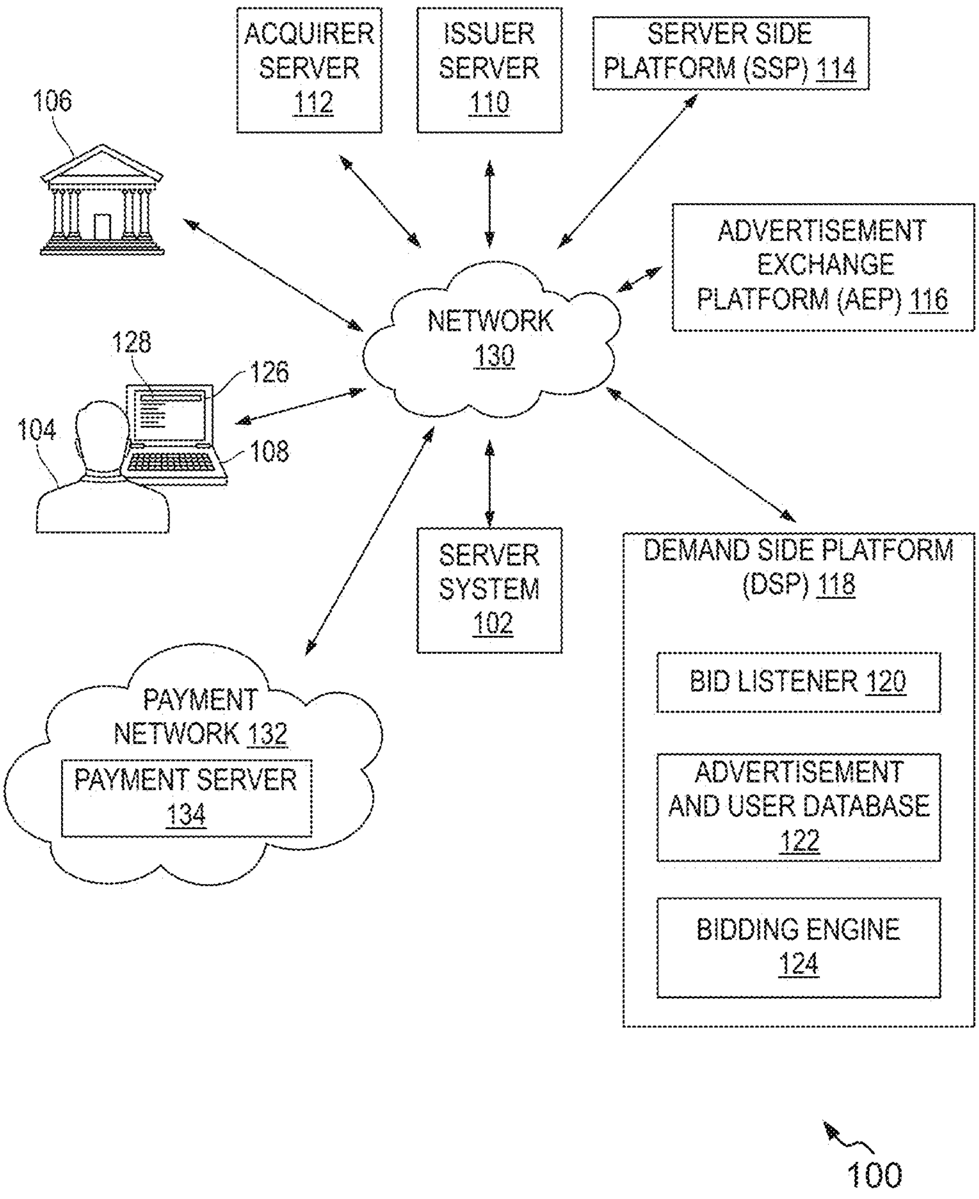
FIG. 1 illustrates a schematic representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to “one embodiment” or “an embodiment” means that a particular feature, structure, or characteristic described in connection with the embodiment is included in at least one embodiment of the present disclosure. The appearances of the phrase “in an embodiment” in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Embodiments of the present disclosure may be embodied as an apparatus, a system, a method, or a computer program product. Accordingly, embodiments of the present disclosure may take the form of an entire hardware embodiment, an entire software embodiment (including firmware, resident software, micro-code, etc.), or an embodiment combining software and hardware aspects that may all generally be referred to herein as a "circuit", "engine", "module", or "system". Furthermore, aspects of the present disclosure may take the form of a computer program product embodied in one or more computer-readable storage media having computer-readable program code embodied thereon.

The terms "payment transaction", "financial transaction", "e-commerce transactions", "digital transaction", and "transaction" are used interchangeably throughout the description and refer to a transaction of payment of a certain amount being initiated by the cardholder. More specifically, refers to electronic financial transactions including, for example, online payment, payment at a terminal (e.g., point of sale (POS) terminal, ATM, self-service kiosks, and the like. It may be understood that online payments can be performed on Electronic-commerce (E-commerce) platforms that are either provided on web browsers or by merchants in the form of mobile applications. For instance, by inputting various payment card details on a payment gateway connected to the merchant on the merchant application, a cardholder may carry out a payment transaction on a merchant's application installed on their smartphone to buy items or pay for services.

The terms "account holder", "user", "cardholder", "consumer", and "buyer" are used interchangeably throughout the description and refer to a person who has a payment account or at least one payment card (e.g., credit card, debit card, etc.) associated with the payment account, that will be used by a merchant to perform a payment transaction. The payment account may be opened via an issuing bank or an issuer server.

The term "merchant", used throughout the description generally refers to a seller, a retailer, a purchase location, an organization, or any other entity that is in the business of selling goods or providing services, and it can refer to either a single business location or a chain of business locations of the same entity.

The term "issuer", used throughout the description, refers to a financial institution normally called an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server called "issuer server" throughout the description.

Further, the term "acquirer", is a financial institution (e.g., a bank) that processes financial transactions for merchants. In other words, this can be an institution that facilitates the processing of payment transactions for physical stores, merchants, or institutions that own platforms that make either online purchases or purchases made via software applications possible (e.g., the shopping cart platform providers and the in-app payment processing providers). The terms "acquirer", "acquiring bank", "acquiring bank" or "acquirer server" will be used interchangeably herein.

The term "payment account" used throughout the description refers to a financial account that is used to fund a financial transaction interchangeably referred to as "payment transaction" or "transaction"). Examples of the financial account include but are not limited to, a savings account, a credit account, a checking account, and a virtual payment account. The financial account may be associated with an entity such as an individual person, a family, a commercial entity, a company, a corporation, a governmental entity, a non-profit organization, and the like. In some scenarios, the financial account may be a virtual or temporary payment account that can be mapped or linked to a primary financial account, such as those accounts managed by payment wallet service providers, and the like.

The terms "payment network" and "card network" are used interchangeably throughout the description and refer to a network or collection of systems used for the transfer of funds through the use of cash substitutes. Payment networks may use a variety of different protocols and procedures in order to process the transfer of money for various types of transactions. Payment networks are companies that connect an issuing bank with an acquiring bank to facilitate online payment. Transactions that may be performed via a payment network may include product or service purchases, credit purchases, debit transactions, fund transfers, account withdrawals, etc. Payment networks may be configured to perform transactions via cash substitutes that may include payment cards, letters of credit checks, financial accounts, etc. Examples of networks or systems configured to perform as payment networks include those operated by such as Mastercard®.

The term "payment card", used throughout the description, refers to a physical or virtual card that may or may not be linked with a financial or payment account that may be presented to a merchant or any such facility to fund a financial transaction via the associated payment account. Examples of the payment card include, but are not limited to, debit cards, credit cards, prepaid cards, virtual payment numbers, virtual card numbers, forex cards, charge cards, e-wallet cards, and stored-value cards. A payment card may be a physical card that may be presented to the merchant for funding the payment. Alternatively, or additionally, the payment card may be embodied in the form of data stored in a user device, where the data is associated with a payment account such that the data can be used to process the financial transaction between the payment account and a merchant's financial account. It is understood that generally, the term "payment transaction" refers to an agreement that is carried out between a buyer and a seller to exchange goods or services in exchange for assets in the form of a payment (e.g., cash, fiat currency, digital asset, cryptographic currency, coins, tokens, etc.).

The term "Advertisement" or "Ad", used throughout the description generally refers to promotional content generated by an Advertiser for a merchant. In other words, an Advertisement can be defined as a public communication that promotes a product, service, brand, or event offered by a merchant. Here, the term 'Advertiser' refers to an entity charged with executing an advertising campaign for the merchant.

The term "cookie" refers to a small piece of data or one or more data files that is stored on a user's device by a web browser or web app while the user is browsing a website/web app. Cookies play a crucial role in digital advertising by enabling advertisers and publishers to track user behavior, personalize ad content, and measure ad effectiveness.

Overview

Various embodiments of the present disclosure provide methods, systems electronic devices, and computer program products for enhancing user identification using transaction information for Demand Side Platforms (DSPs) are disclosed.

In a specific embodiment, the server system may be embodied within a payment server associated with a payment network. Further, in an embodiment, the server system is configured to receive a user registration request from a Demand Side Platform (DSP). The user registration request may include a first user identifier (ID) and advertisement-linked transaction information. In a non-limiting example, the advertisement-linked transaction information may include at least an Internet Protocol (IP) of the user, merchant information, transaction amount, transaction time of an advertisement-linked transaction, and the like. It should be noted that the user performs an advertisement-linked transaction with a merchant upon clicking on an advertisement generated by the DSP.

The server system is further configured to access a historical transaction dataset from a database associated with the server system. The historical transaction dataset may include transaction-related information associated with a plurality of transactions performed by a plurality of users.

Further, the server system is configured to identify a user from the plurality of users based, at least in part, on the advertisement-linked transaction information and the historical transaction dataset. In one embodiment, for identifying the user, the server system may be configured to compare the advertisement-linked transaction information with the transaction-related information to select the user from the plurality of users.

The server system may then link the user with the first user ID. In one embodiment, the DSP may be configured to generate the first user ID. In a non-limiting implementation, for linking the user with the first user ID, the server system may be configured to determine a user Permanent Account Number (PAN) of the user based, at least in part, on the transaction-related information. The server system may be further configured to link the user PAN of the user with the first user ID.

Later, the server system may receive a new user registration request from the DSP. The new user registration request may include a second user ID and advertisement-linked second transaction information. In one embodiment, the DSP may be configured to generate the second user ID. The server system may check if the new user registration request is associated with an existing user from the plurality of users based, at least in part, on the advertisement-linked second transaction information and the historical transaction dataset. Herein, the existing user may be the user that is already linked with the first user ID.

In one embodiment, for checking if the new user registration request is associated with the existing user, the server system may be configured to identify a subsequent user from the plurality of users based, at least in part, on the advertisement-linked second transaction information and the historical transaction dataset. Further, the server system may determine if a subsequent user PAN is linked with an existing user ID. Upon determining that the subsequent user PAN is linked with the first user ID, the server system may determine that the existing user is the user.

In one embodiment, upon determining that the existing user is the user, the server system may then facilitate the transmission of an existing user response message to the DSP. The existing user response message may include the first user ID of the user. In another embodiment, upon determining that the existing user does not exist, the server system may facilitate the transmission of a registration successful response message to the DSP. Further, in a specific embodiment, the server system may be configured to link the user with the second user ID.

In some embodiments, the server system may be configured to extract a plurality of user transactions from the plurality of transactions based, at least in part, on the transaction-related information. The plurality of user transactions may indicate transactions performed by the user. The server system may further be configured to generate a spending behavior profile of the user based, at least in part, on the plurality of user transactions. Further, the server system may be configured to facilitate the transmission of the spending behavior profile of the user and the first user ID to the DSP.

Various embodiments of the present disclosure offer multiple advantages and technical effects. For instance, the present disclosure provides a novel process for enhancing user identification using transaction information for Demand Side Platforms (DSPs).

As may be appreciated, upon receiving the first user ID, the DSP can link the user profile associated with the user linked to the first user to another user profile associated with the new user (i.e., the same user) linked to the second user ID. Upon determining this link, the DSP can utilize the older cookie data, browser history, or IP address of the user along with the newer cookie data, browser history, or IP address of the user (which was assumed as the new user) to generate an enhanced user profile of the user. This enhanced user profile may then be utilized by the advertisers or DSP to create improved targeted Ads with significantly improved performance for the user 104. In other words, the various embodiments of the present disclosure enable the DSP to connect different user profiles (generated during distinct user sessions) belonging to the same user thereby, enabling the advertisers or the DSP to serve better and relevant Ads to the user. Thus, improving the performance of the Ad campaign of the merchant. Further, the spending behavior profile that identifies behavior patterns in the transactions of a corresponding user can assist the advertisers using the DSP in understanding the changing consumer/user activity. Thus, leading to further improvements in the performance of the Ad campaign of the merchant.

Various embodiments of the present disclosure are described hereinafter with reference to FIGS. 1 to 8.

FIG. 1 illustrates a schematic representation of an environment 100 related to at least some example embodiments of the present disclosure. Although the environment 100 is presented in one arrangement, other embodiments may include the parts of the environment 100 (or other parts) arranged otherwise depending on, for example, linking a user (such as user 104) to a first user ID, determining if the user 104 is an existing user, enhancing user identification using transaction-related information and so on.

The environment 100 generally includes a plurality of entities such as a server system 102, a user 104, a merchant 106, an electronic device 108 associated with the user 104, an issuer server 110, an acquirer server 112, a Server Side Platform (SSP) 114, an Advertisement Exchange Platform (AEP) 116, a Demand Side Platform (DSP) 118 including a bid listener 120, an advertisement and user database 122, and a bidding engine 124, and a payment network 132 including a payment server 134, each coupled to, and in communication with (and/or with access to) a network 130. It is noted that although each of the plurality of entities is depicted to be standalone singular entities, there may exist multiples of any of these entities within the RTB environment and the same would be covered within the scope of the present disclosure.

The network 130 may include, without limitation, a Light Fidelity (Li-Fi) network, a Local Area Network (LAN), a Wide Area Network (WAN), a Metropolitan Area Network (MAN), a satellite network, the Internet, a fiber optic network, a coaxial cable network, an infrared (IR) network, a Radio Frequency (RF) network, a virtual network, and/or another suitable public and/or private network capable of supporting communication among two or more of the parts or users illustrated in FIG. 1, or any combination thereof. Various entities in the environment 100 may connect to the network 130 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, New Radio (NR) communication protocol, any future communication protocol, or any combination thereof. In some instances, the network 130 may utilize a secure protocol (e.g., Hypertext Transfer Protocol (HTTP), Secure Socket Lock (SSL), and/or any other protocol, or set of protocols for communicating with the various entities depicted in FIG. 1.

In an embodiment, the user 104 may be any individual, representative of a corporate entity, a non-profit organization, or any other person who is presenting payment card details during an electronic payment transaction. The user 104 may have a payment account issued by an issuing bank (not shown in figures) associated with an issuer server (e.g., the issuer server 110) and may be provided with a payment card with financial or other account information encoded onto the payment card such that the user 104 may use the payment card to initiate and complete a payment transaction using a bank account at the issuing bank. In an example, the user 104 may also be called a cardholder or an account holder.

In another embodiment, the user 104 may use their corresponding electronic device 108 to access a mobile application, a website, or a webpage (see, webpage 126) within the website to perform various activities on the internet or within the mobile application. In particular, the user 104 may click on an advertisement (see, 128) to buy a product on the webpage 126 and completes the purchase using their payment card. Further, the user 104 may use their electronic device 108 to access a mobile application, or a website associated with the issuing bank, or any third-party payment application to perform a payment transaction. In various non-limiting examples, the electronic device 108 may refer to any electronic device such as, but not limited to, a Personal Computer (PC), a tablet device, a smart wearable device, a Personal Digital Assistant (PDA), a voice-activated assistant, a Virtual Reality (VR) device, a smartphone, a laptop, and the like.

In an embodiment, the merchant 106 may refer to a retail shop, a restaurant, a supermarket or an establishment, a government and/or a private agency, or any such places equipped with POS terminals or websites/webpages, where user 104 may visit to perform financial transactions in exchange for any products, goods and/or services.

In one scenario, the user 104 may use their corresponding payment card to conduct payment transactions with the merchant 106. Moreover, it may be noted that the user 104 may use their corresponding payment card differently or make the payment transaction using different means of payment such as net banking, Unified Payments Interface (UPI) payment, cheque, etc. For instance, the user 104 may utilize a payment card to perform an online payment transaction. More specifically, the user 104 may enter details of the payment card to transfer funds in the form of fiat currency on an e-commerce platform to buy goods.

In one embodiment, the user 104 may be associated with a financial institution such as an issuing bank that is associated with the issuer server 110. Herein, it is noted that the terms "issuer bank", "issuing bank" or simply "issuer", hereinafter may be used interchangeably. It may be understood that the user 104 may have a payment account with the issuing bank, (that may issue a payment card, such as a credit card or a debit card to the user 104). Further, the issuing banks provide microfinance banking services (e.g., payment transactions using credit/debit cards) for processing electronic payment transactions, to the user 104.

In an embodiment, the merchant 106 is generally associated with a financial institution such as an acquiring bank who is associated with the acquirer server 112. Herein, it is noted that the terms "acquirer", "acquiring bank", or "acquirer server", will be used interchangeably hereinafter. Herein, the acquiring bank can be an institution that facilitates the processing of payment transactions for physical stores, merchants, or institutions that own platforms that make either online purchases or purchases made via software applications possible.

In an embodiment, the SSP 114 is a platform that is used by publishers of websites or applications to manage and sell their Ad inventory programmatically. The term publisher refers to an owner of a web page or application where an Ad will be shown to generate revenue using this Ad. In some instances, multiple Ads from different advertisers may be shown at different Ad slots within the publisher's webpage or application. Further, SSP 114 enables publishers to connect with multiple Ad exchanges and demand sources, maximizing the value of their ad inventory. For instance, when the user 104 visits a webpage or mobile app, the SSP 114 sends bid requests to multiple DSPs, initiating the RTB auction process. It is noted that the terms 'Server Side Platform', 'SSP', and 'supply side platform', will be used interchangeably hereinafter.

In an embodiment, the AEP 116 is a platform that serves as a marketplace where ad impressions are bought and sold through real-time auctions. The AEP 116 is responsible for connecting advertisers, publishers, and ad networks in a real-time auction environment. For instance, when an ad request is received, the AEP 116 conducts an auction to determine which advertiser's Ad should be displayed in the available ad space on the publisher's webpage or application. Generally, the highest bidder from the advertisers is awarded the available ad space.

In an embodiment, the DSP 118 is a platform that is used by advertisers associated with the merchants to participate in RTB auctions for bidding on different ad impressions. The DSP 118 allows advertisers to target specific audience segments, set bidding parameters, and optimize their ad campaigns in real time. The DSP 118 typically integrates with multiple AEPs and SSPs to access a wide range of ad inventory across various publishers. The DSP 118 further includes the bid listener 120, the advertisement and user database 122, and the bidding engine 124. The bid listener 120 is a component or functionality in the DSP 118 that monitors the bid requests coming from the SSP 114 or the AEP 116. Further, once the bid is formulated by the bidding engine 124, the bid listener 120 submits it to the SSP 114 or AEP 116 conducting the auction. The bid for the advertisement is sent in real-time and competes against bids from other advertisers targeting the same Ad impression. In DSP 118, the advertisement and user database 122 is a central repository or database that stores information about users (such as user 104) who interact with the digital advertisement. In various non-limiting examples, the advertisement and user database 122 may include various data points and attributes associated with individual users, which are collected from different sources and used to inform advertising targeting and optimization strategies. The bidding engine 124 is a core component of the DSP 118 that is responsible for participating in real-time auctions for Ad impressions on behalf of advertisers. Upon receiving a bid request from the bid listener 120, the bidding engine 124 is configured to analyze the available information to determine the value of the Ad impression for the advertiser. For this analysis, the bidding engine 124 considers factors such as but not limited to the advertiser's targeting criteria, historical performance data, budget constraints, and campaign objectives. Based on its analysis, the bidding engine 124 formulates a bid that represents the maximum amount the advertiser is willing to pay for the Ad impression. This bid is typically determined through real-time algorithms that optimize for factors like Return On Investment (ROI), conversion rates, and campaign performance goals. Once the bid is formulated, and bid-prices is decided, the bidding engine 124 transmits or sends the bid to bid listener 120 for posting to SSPs such as SSP 114 or AEPs such as 116.

In one embodiment, the payment network 132 may be used by the payment card issuing authorities as a payment interchange network. Examples of payment interchange networks include but are not limited to, Mastercard® payment system interchange network. The Mastercard® payment system interchange network is a proprietary communications standard promulgated by Mastercard International Incorporated® for the exchange of electronic payment transaction data between issuers and acquirers that are members of Mastercard International Incorporated®. (Mastercard is a registered trademark of Mastercard International Incorporated located in Purchase, N.Y.). The payment server 134 is a server associated with the payment network 132 that is configured to facilitate the various operations of the payment network 132.

As described earlier, tracking user-related information across various websites. Generally, DSPs track user-related information using the IP address of the user 104 along with cookies and browser history data. As may be understood, user-related information allows advertisers to profile their target users with unprecedented accuracy. Therefore, the DSP 118 must maintain and continuously update this user-related information based on the activities of the user 104. However, it has been observed that DSPs often lose the ability to identify an existing user in their advertisement and user database 122 when the cookies or browser history is either deleted or reset by the user manually or automatically. Similarly, the DSP 118 may also fail to identify an existing user in their advertisement and user database 122 when the IP address associated with the user's electronic device 108 changes. This may occur quite often if the user 104 has subscribed to a dynamic IP with their ISP. This inability of the DSP 118 to identify existing users results in improper segmentation of users and eventually results in sub-optimal bidding strategies and less effective Ad placements leading to financial losses and lackluster Ad performance for the merchant 106.

The above-mentioned technical problems, among other problems, are addressed by one or more embodiments implemented by the server system 102 and methods thereof provided in the present disclosure.

In one embodiment, the server system 102 is configured to enhance user identification using transaction-related information for the DSP 118 within a real-time advertisement bidding system, and the like.

In some embodiments, the server system 102 may be deployed as a standalone server or may be implemented in the cloud as software as a service (SaaS). In another embodiment, the server system 102 is configured to facilitate an instance of a software application running on an electronic device used by the payment processors to perform certain operations, so that the server system 102 can determine if an existing user is being linked with a new user ID.

In one embodiment, the environment 100 may further include a database (not shown) coupled with the server system 102. In an example, the server system 102 coupled with the database is embodied within the payment server 134, however, in other examples, the server system 102 can be a standalone component (acting as a hub) connected to the acquirer 112 and the issuers 110. The database may be incorporated in the server system 102 or maybe an individual entity connected to the server system 102 or maybe a database stored in cloud storage. In one embodiment, the database may store a historical transaction dataset, and other necessary machine instructions required for implementing the various functionalities of the server system 102 such as firmware data, operating system, and the like.

In various non-limiting examples, the database may include one or more Hard Disk Drives (HDD), Solid-State Drives (SSD), an Advanced Technology Attachment (ATA) adapter, a Serial ATA (SATA) adapter, a Small Computer System Interface (SCSI) adapter, a redundant array of independent disks (RAID) controller, a Storage Area Network (SAN) adapter, a network adapter, and/or any component providing the server system 102 with access to the database. In one implementation, the database may be viewed, accessed, amended, updated, and/or deleted by an administrator (not shown) associated with the server system 102 through a database management system (DBMS) or relational database management system (RDBMS) present within the database.

In other various examples, the database may also include multifarious data, for example, social media data, Know Your Customer (KYC) data, payment data, trade data, employee data, Anti Money Laundering (AML) data, market abuse data, Foreign Account Tax Compliance Act (FATCA) data, and fraudulent payment transaction data. In addition, the database provides a storage location for data and/or metadata obtained from various operations performed by the server system 102.

In an embodiment, the historical transaction dataset may include transaction-related information related to a plurality of payment transactions performed between a plurality of users with a plurality of merchants within the payment network 132. The historical transaction dataset may include but is not limited to, transaction-related information, such as transaction amount, source of funds such as bank or credit cards, transaction channel used for loading funds such as POS terminal or ATM, transaction velocity features such as count and transaction amount sent in the past 'x' number of days to a particular user, transaction location information, external data sources, merchant country, merchant Identifier (ID), cardholder ID, cardholder product, cardholder Permanent Account Number (PAN), Merchant Category Code (MCC), merchant location data or merchant co-ordinates, merchant name, city, zip code merchant industry, merchant super industry, ticket price or ticket Size, number of unique cards, location, transaction channel (POS/Ecomm/Cash), product code and other transaction-related data. The historical transaction dataset enables the server system 102 to create a spending behavior profile for each user that identifies patterns in the transactions of the corresponding user that will assist the advertisers using the DSP 118 in understanding the changing consumer/user activity.

In an embodiment, the server system 102 is configured to receive a user registration request from the DSP 118. The user registration request may include at least a first user ID and advertisement-linked transaction information. In various non-limiting examples, the advertisement-linked transaction information includes at least an IP of the user 104, merchant information, transaction amount, and transaction time of an advertisement-linked transaction. In some instances, device ID of the user 104 may also be present in the advertisement-linked transaction information. Herein, a payment transaction is called an advertisement-linked transaction if the same was triggered by the user 104 in response to clicking on an advertisement shown on a publisher's webpage or application. Then, the server system 102 is configured to access the historical transaction dataset from the database associated with the server system 102. Thereafter, the server system 102 is configured to identify the user 104 from the plurality of users based, at least in part, on the advertisement-linked transaction information and the historical transaction dataset. Upon successful identification of the user 104, the server system is configured to link the user with the first user ID.

Further, the server system 102 is configured to receive a new user registration request from the DSP 118. The new user registration request may include at least a second user ID and advertisement-linked second transaction information. In various non-limiting examples, the advertisement-linked second transaction information includes at least an IP of the new user, merchant information at which the new user performed the advertisement-linked second transaction, transaction amount, and transaction time of the advertisement-linked second transaction. In some instances, device ID of the new user may also be present in the advertisement-linked second transaction information.

Furthermore, the server system 102 is configured to check if the new user registration request is associated with an existing user from the plurality of users based, at least in part, on the advertisement-linked second transaction information and the historical transaction dataset. Herein, the term 'existing user' refers to the user 104 that is already linked with the first user ID. In other words, the server system 102 determines if the advertisement-linked second transaction is performed by a user that has already been linked with a user ID in the past. It is noted that such a situation where the DSP 118 forgets that the new user is an existing user may arise when the user 104 deletes or resets their cookie data, browser history, or IP address. In some instances, device ID of the new user may be compared with previously received device ID of the user 104 as well to check if the new user registration request is associated with an existing user.

Upon determining that the existing user is the user 104, the server system 102 is configured to facilitate the transmission of an existing user response message to the DSP. The existing user response message includes at least the first user ID of the user 104. As may be appreciated, upon receiving the first user ID, the DSP 118 can link the user profile associated with the user 104 linked to the first user ID to the user profile associated with the new user linked to the second user ID. Upon determining this link, the DSP 118 can utilize the older cookie data, browser history, or IP address of the user 104 along with the newer cookie data, browser history, or IP address of the user 104 (which was assumed as the new user) to generate an enhanced user profile of the user 104. This enhanced user profile may then be utilized by the advertisers or DSP 118 to create improved targeted Ads with significantly improved performance for the user 104.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. In addition, the server system 102 should be understood to be embodied in at least one computing device in communication with the network 130, which may be specifically configured, via executable instructions, to perform steps as described herein, and/or embodied in at least one non-transitory computer-readable media.

Figure 2:
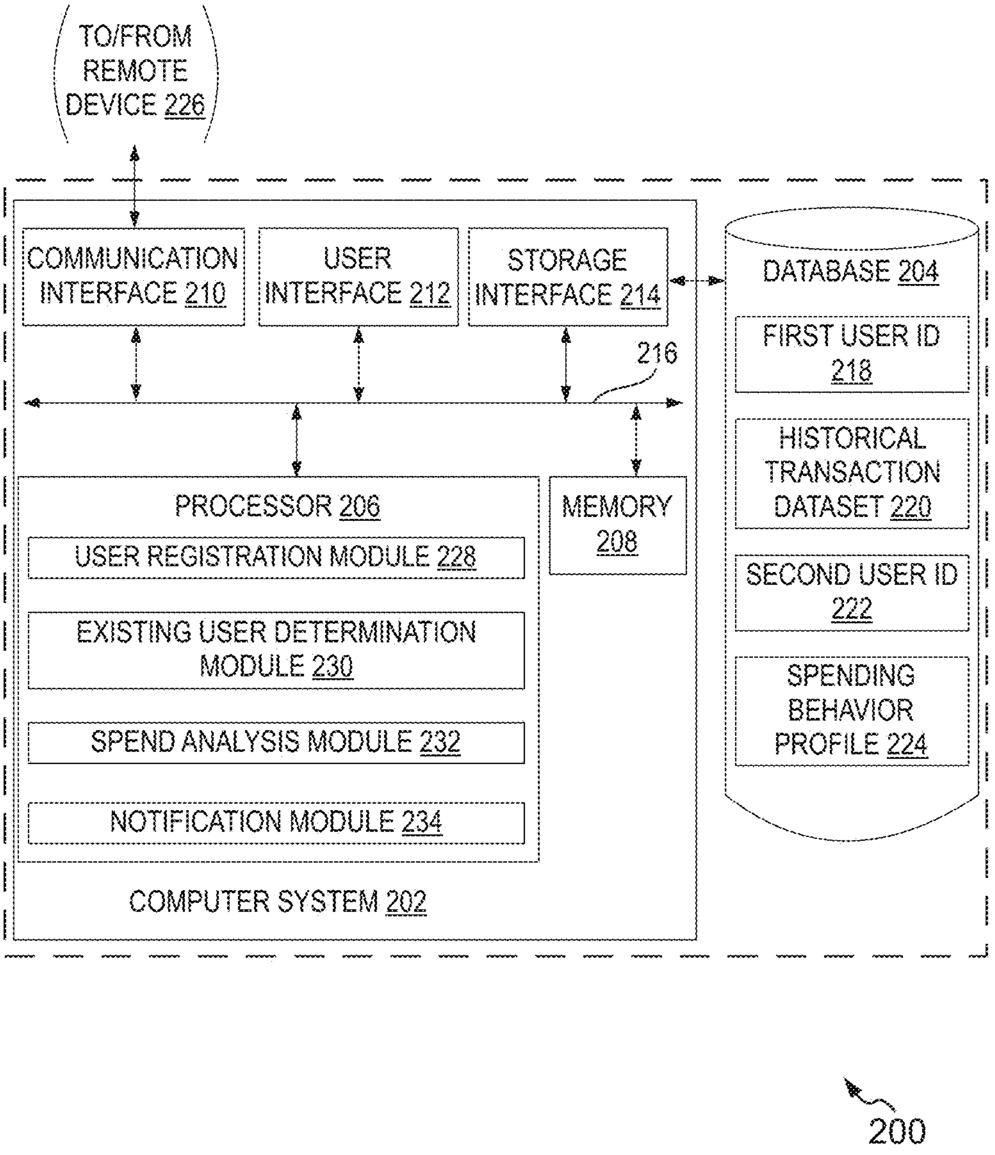
FIG. 2 illustrates a simplified block diagram of a server system, in accordance with an embodiment of the present disclosure.

FIG. 2 illustrates a simplified block diagram of a server system 200, in accordance with an embodiment of the present disclosure. The server system 200 is identical to the server system 102 of FIG. 1. In one embodiment, the server system 200 is a part of the payment network 132 or integrated within the payment server 134. In some embodiments, the server system 200 is embodied as a cloud-based and/or SaaS-based (software as a service) architecture.

In various non-limiting examples, the server system 200 is configured to perform various operations such as linking the PAN of the user 104 with a first user ID and a second user ID, determining if the user 104 is an existing user, enhancing user identification for the DSP 118, notifying the DSP 118 if the new user is an existing user and the like. As illustrated, the server system 200 includes a computer system 202 and a database 204. The computer system 202 includes at least one processor 206 for executing instructions, a memory 208, a communication interface 210, a user interface 212, and a storage interface 214. The one or more components of the computer system 202 communicate with each other via a bus 216. The components of the server system 200 provided herein may not be exhaustive and the server system 200 may include more or fewer components than those depicted in FIG. 2. Further, two or more components depicted in FIG. 2 may be embodied in one single component, and/or one component may be configured using multiple sub-components to achieve the desired functionalities.

In some embodiments, the database 204 is integrated into the computer system 202. In one non-limiting example, the database 204 is configured to store a first user ID 218, a historical transaction dataset 220, a second user ID 222, a spending behavior profile 224, and the like.

In an embodiment, the computer system 202 may include one or more hard disk drives as the database 204. The user interface 212 is an interface such as a Human Machine Interface (HMI) or a software application that allows users such as an administrator (not shown) to interact with and control the server system 200 or one or more parameters associated with the server system 200. It may be noted that the user interface 212 may be composed of several components that vary based on the complexity and purpose of the application. Examples of components of the user interface 212 may include visual elements, controls, navigation, feedback and alerts, user input and interaction, responsive design, user assistance and help, accessibility features, and the like. More specifically these components may correspond to icons, layout, color schemes, buttons, sliders, dropdown menus, tabs, links, error/success messages, mouse and touch interactions, keyboard shortcuts, tooltips, screen readers, and the like.

In an embodiment, the storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute operations for enhancing user identification for the DSP 118 using transacting-related information, and the like. Examples of the processor 206 include, but are not limited to, an Application-Specific Integrated Circuit (ASIC) processor, a Reduced Instruction Set Computing (RISC) processor, a Graphical Processing Unit (GPU), a complex instruction set computing (CISC) processor, a Field-Programmable Gate Array (FPGA), and the like.

The memory 208 includes suitable logic, circuitry, and/or interfaces to store a set of computer-readable instructions for performing operations. Examples of the memory 208 include a Random-Access Memory (RAM), a Read-Only Memory (ROM), a removable storage drive, a Hard Disk Drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210, such that the processor 206 is capable of communicating with a remote device 226 such as the issuer server 110, the acquirer server 112, the payment server 134, or communicating with any entity connected to the network 130 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2. It should be noted that the server system 200 is identical to the server system 102 described in reference to FIG. 1.

In one implementation, the processor 206 includes a user registration module 228, an existing user determination module 230, a spend analysis module 232, and a notification module 234. It should be noted that components, described herein, such as the user registration module 228, the existing user determination module 230, the spend analysis module 232, and the notification module 234 can be configured in a variety of ways, including electronic circuitries, digital arithmetic, and logic blocks, and memory systems in combination with software, firmware, and embedded technologies. Moreover, it may be noted that the user registration module 228, the existing user determination module 230, the spend analysis module 232, and the notification module 234 may be communicably coupled with each other to exchange information with each other for performing the one or more operations facilitated by the server system 200.

In an embodiment, the user registration module 228 includes suitable logic and/or interfaces for receiving a user registration request from the DSP 118. In an implementation, the user registration request includes at least a first user ID 218 and advertisement-linked transaction information. The first user ID is generated by the DSP 118 when it encounters a new user interacting with a publisher's webpage or application. More specifically, when the SSP 114 transmits the cookie data, browser history, and IP address of the new user such as the user 104. Upon receiving this information, the DSP 118 generates the first user ID 218 and assigns it to a user profile of the user 104. Once, the user 104 clicks on an Ad to perform a transaction, called advertisement-linked transaction, the DSP 118 collects the advertisement-linked transaction information associated with the advertisement-linked transaction. In various non-limiting examples, the advertisement-linked transaction information includes at least an IP of the user 104, merchant information, transaction amount, and transaction time of an advertisement-linked transaction. Then, the DSP 118 is configured to transmit the user registration request to the user registration module 228 of the server system 200.

The user registration module 228 is further configured to access the historical transaction dataset 220 from the database 204 associated with the server system 200. The historical transaction dataset may include transaction-related information related to a plurality of payment transactions performed between a plurality of users with a plurality of merchants within the payment network 132. In various non-limiting examples, the historical transaction dataset may include but is not limited to, transaction-related information, such as transaction amount, source of funds such as bank or credit cards, transaction channel used for loading funds such as POS terminal or ATM, transaction velocity features such as count and transaction amount sent in the past 'x' number of days to a particular user, transaction location information, external data sources, merchant country, merchant Identifier (ID), cardholder ID, cardholder product, cardholder Permanent Account Number (PAN), Merchant Category Code (MCC), merchant location data or merchant co-ordinates, merchant name, city, zip code merchant industry, merchant super industry, ticket price or ticket Size, number of unique cards, location, transaction channel (POS/Ecomm/Cash), product code and other transaction-related data The user registration module 228 is further configured to identify the user 104 from the plurality of users based, at least in part, on the advertisement-linked transaction information and the historical transaction dataset. As may be understood, there exists many users and merchants within the payment network 132, the user registration module 228 needs to determine which exact user has performed the advertisement-linked transaction from the multiple users. In particular, the user registration module 228 compares the advertisement-linked transaction information with the transaction-related information to select the user 104 from the plurality of users to perform the identification process.

Then, the user registration module 228 links the user with the first user ID. In particular, the user registration module 228 determines a PAN (or user PAN) of the user 104 based, at least in part, on the transaction-related information. Then, the user registration module 228 links the user PAN of the user 104 with the first user ID. Further, the user registration module 228 may be configured to transmit a registration successful message indicating the successful linking of the user PAN with the first user ID.

In an embodiment, the existing user determination module 230 includes suitable logic and/or interfaces for receiving a new user registration request from the DSP 118. In an implementation, the new user registration request includes a second user ID and advertisement-linked second transaction information. The second user ID is generated by the DSP 118 when it encounters the same user interacting with a publisher's webpage or application in a scenario where the user 104 has deleted or reset the cookie data, browser history, and IP address, the DSP 118 is unable to determine that the user 104 is an existing user. More specifically, when the SSP 114 transmits the new cookie data, browser history, and IP address of the user 104. Upon receiving this information, the DSP 118 assumes that the user 104 is a new user, thus generating the second user ID 222. Further, the DSP 118 assigns it to a new user profile of the user 104. Once, the user 104 clicks on a new Ad to perform a transaction, called advertisement-linked second transaction, the DSP 118 collects the advertisement-linked second transaction information associated with the advertisement-linked second transaction. In various non-limiting examples, the advertisement-linked second transaction information includes at least a new IP of the user 104, merchant information at which the advertisement-linked second transaction is performed, transaction amount, and transaction time of an advertisement-linked second transaction. Then, the DSP 118 is configured to transmit the new user registration request to the server system 200.

Upon receiving the new user registration request, the existing user determination module 230 is configured to check if the new user registration request is associated with an existing user from the plurality of users based, at least in part, on the advertisement-linked second transaction information and the historical transaction dataset. Herein, the existing user is defined as the user 104 that is already linked with the first user ID. More specifically, the existing user determination module 230 is configured to identify a subsequent user from the plurality of users based, at least in part, on the advertisement-linked second transaction information and the historical transaction dataset. Then, determine if a subsequent user PAN is linked with an existing user ID. Further, upon determining that the subsequent user PAN is linked with the first user ID, the existing user determination module 230 determines that the existing user is the user 104.

In an embodiment, upon determining that the existing user is the user 104, the existing user determination module 230 is further configured to utilize the notification module 234 to facilitate the transmission of an existing user response message to the DSP 118. In an implementation, the existing user response message includes the first user ID of the user 104. As may be appreciated, upon receiving the first user ID of the user 104, the DSP 118 can link the older user profile of the user 104 linked to the first user ID with the new user profile of the user 104 linked to the second user ID. Thus, allowing the DSP 118 and the advertisers to generate improved targeted advertisements for the user 104 which was previously not possible.

In an embodiment, upon determining that the existing user does not exist, the existing user determination module 230 is further configured to utilize the notification module 234 to facilitate the transmission of a registration successful response message to the DSP 118.

In an embodiment, the spend analysis module 232 includes suitable logic and/or interfaces for generating a spending behavior profile 224 of the user 104 using the historical transaction dataset 220. In particular, the spend analysis module 232 is configured to extract a plurality of user transactions from the plurality of transactions based, at least in part, on the transaction-related information. Herein, the plurality of user transactions indicates transactions performed by the user 104. Further, the spend analysis module 232 is configured to generate the spending behavior profile 224 of the user 104 based, at least in part, on the plurality of user transactions. In various non-limiting examples, AI or ML models trained for user profiling may be used to generate the spending behavior profile 224 of the user 104 based, at least in part, on the plurality of user transactions. Furthermore, the spend analysis module 232 is configured to utilize the notification module 234 to facilitate the transmission of the spending behavior profile 224 of the user 104 and the first user ID 218 to the DSP 118. As may be appreciated, the DSP 118 can utilize the spending behavior profile 224 of the user with its user profile to improve the behavior profiling of the user 104. Thus, allowing the DSP 118 and the advertisers to generate improved targeted advertisements for the user 104 which was previously not possible.

In an embodiment, the notification module 234 includes suitable logic and/or interfaces for facilitating the transmission of various request and response messages described herein. In various instances, the various request and response messages described herein may be transmitted or exchanged with any of the plurality of entities described in FIG. 1 such as but not limited to the DSP 118 as any one or more of an Application Programming Interface (API) message, an Extensible Markup Language (XML) message, an HTML message and so on.

Figure 3:
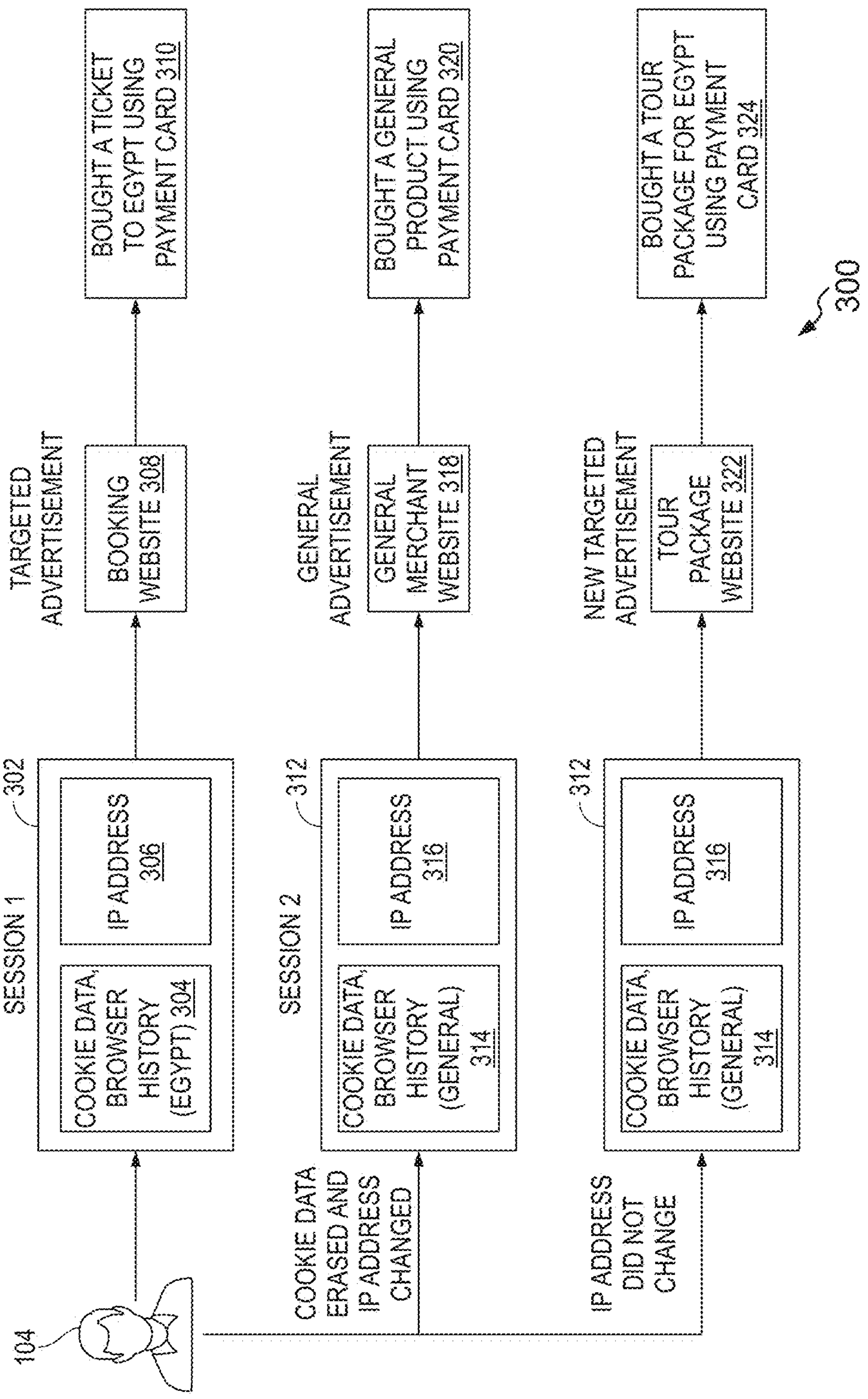
FIG. 3 depicts an exemplary scenario for identifying an existing user between different user sessions, in accordance with an embodiment of the present disclosure.

FIG. 3 depicts an exemplary scenario 300 for identifying an existing user between different user sessions, in accordance with an embodiment of the present disclosure.

In an embodiment, the user 104 during a first user session 302 (see, session 1) may have cookie data and browser history 304 along with an IP address 306 associated with the electronic device 108 of the user. The user session may be defined as a duration for which a series of actions or activities performed by the user 104 are tracked with the same cookie data and browser history 304 or the same IP address 306. In other words, if any of this information changes, the ongoing user session is said to be completed and a new user session is said to be initiated. During the first user session 302, the cookies and browser history 304 of the user 104 may indicate that the user 104 is researching travel itineraries, hostel locations, and local restaurants for Egypt. The cookie data and browser history 304 may be collected by the SSP 114 and shared with the DSP 118 through the AEP 116. The advertisers associated with the airline ticket booking website (see, 308) merchant may generate targeted Ads for booking round-trip tickets for Egypt. This targeted Ad is then delivered to the publisher's webpage on which the user logs on to next by the DSP 118 through the AEP 116. Now, if the user 104 buys the round-trip tickets for Egypt by clicking on the targeted Ad and completing the transaction using their payment card (see, 310) then, then DSP 118 may inform the server system 200 about the first user ID assigned to the user 104 and the advertisement-linked transaction information for the round-trip tickets. Since the server system 200 already keeps a log of all the transactions performed by all the users in its database, it can easily determine which user (i.e., user 104) bought the round-trip tickets. Upon determination, the server system 200 can assign or link the first user ID to the PAN of the payment card associated with the user 104.

Now, if the user 104 clears, deletes, or resets either one of the cookie data, browser history, or IP address 306, then a new user session, i.e., a second user session 312 is said to have begun (i.e., session 2). In some instances, a new IP address 316 may be assigned to the user 104 by their ISP as well. During the second user session 312, when the when logs into a subsequent webpage, the fresh cookie data and browser history (depicted by cookie data and browser history 314) or the fresh IP address 316 may be collected by the SSP 114 and shared with the DSP 118 through the AEP 116. The DSP 118 will then assign a new user ID, i.e., the second user ID to the user 104. Now, the advertisers may generate Ads based on this cookie data and browser history 314, since there might exist no correlation between the cookie data and browser history 314 and the previous cookie data and browser history 304, the advertisers can only generate a general Ad for a general merchant website 318. This general Ad is then delivered to the subsequent publisher's webpage through the AEP 116. Now, the user 104 buys the general product suggested by the general Ad (see, bought a general product using payment card 320) by clicking on it and completing the transaction using the same payment card (see, 320). Then, then DSP 118 may inform the server system 200 about the second user ID assigned to the user 104 and the advertisement-linked second transaction information for the general product. Since the server system 200 already keeps a log of all the transactions performed by all the users in its database, it can easily determine that the user (i.e., user 104) already has the first user ID linked to it. Therefore, it is understood that this general product is purchased by an existing user. In this scenario, the server system 200 informs the DSP 118 that the second user ID can be mapped to the first user ID, thus allowing the DSP 118 to create a link between the cookie data and browser history 304 and the cookie data and browser history 314. Similarly, a link can be established between the IP address 306 and IP address 316 as well.

Upon establishing this connection, the DSP 118 can enhance the profile of the user 104, thus allowing advertisers to precisely target the customers using both the cookie data and browser history 304 and the cookie data and browser history 314. Now, if the user 104 moves on to another webpage during the same session, i.e., the second session 312, the DSP 118 can furnish more targeted Ads to the user 104. For instance, the user may be shown Ads related to famous restaurants or a tour package website 322 for tourist packages in Egypt. Now, the user 104 can purchase the tour package from the tour package website 322 suggested by the new targeted Ad (see, bought a tour package for Egypt using payment card 324) by clicking on it and completing the transaction using the same payment card (see, 324).

Figure 4A:
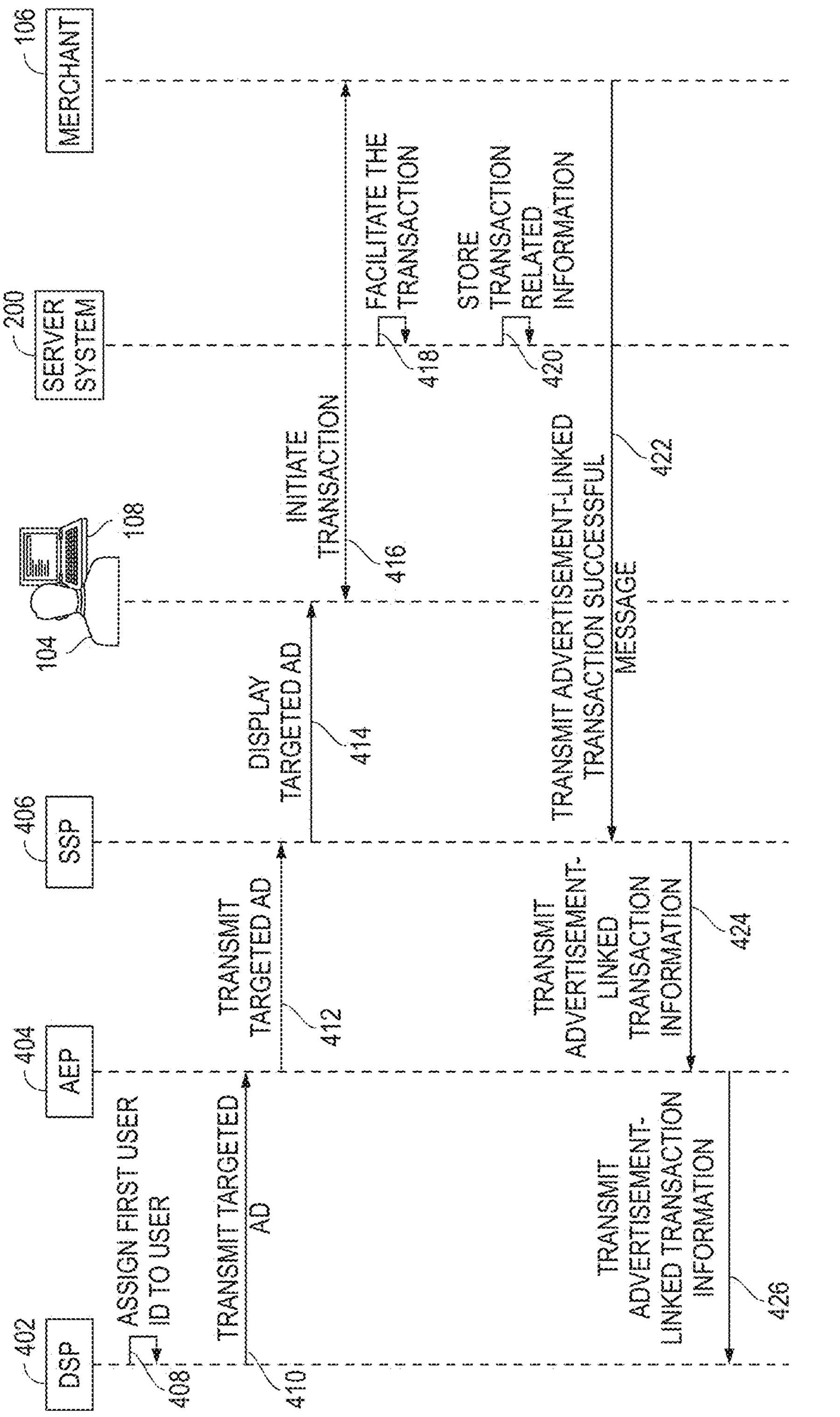
FIG. 4A and FIG. 4B, collectively, provide a sequence flow diagram depicting a process for determining if an existing user is performing a subsequent payment transaction using the same payment card in response to an advertisement facilitated by the DSP with a new IP address or cookies, in accordance with an embodiment of the present disclosure.
Figure 4B:
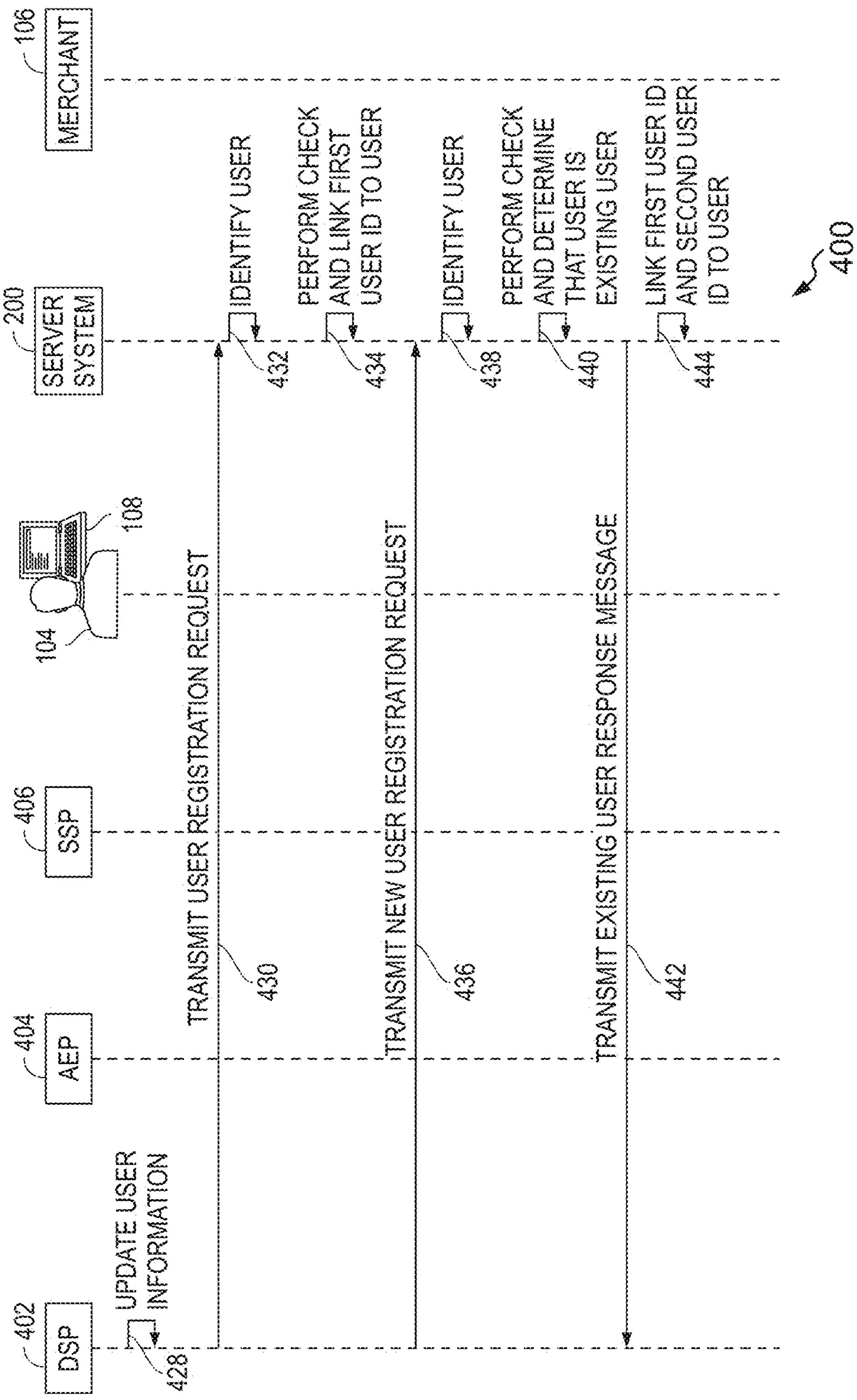

FIG. 4A and FIG. 4B, collectively, provide a sequence flow diagram 400 depicting a process for determining if an existing user is performing a subsequent payment transaction using the same payment card in response to an advertisement facilitated by the DSP 402 with a new IP address or cookies, in accordance with an embodiment of the present disclosure. The sequence of operations of the sequence flow diagram 400 may not be necessarily executed in the same order as they are presented. Further, one or more operations may be grouped and performed in the form of a single step, or one operation may have several sub-steps that may be performed in parallel or in a sequential manner. It is to be noted that to explain the sequence flow diagram 400, references may be made to elements described in FIGS. 1-2. It is understood that the various steps of the sequence flow have already been explained with reference to FIGS. 1 and 2, therefore an explanation for the same is not repeated herein for the sake of brevity. It is noted that the DSP 402, the AEP 404, and the SSP 406 are identical to the DSP 118, the AEP 116, and the SSP 114 of FIG. 1, respectively. It is understood that the various steps of this sequence flow have already been described with reference to FIGS. 1 and 2 earlier, therefore the explanation for the various steps is not repeated again for the sake of brevity. Further, the process depicted by sequence flow diagram 400 assumes that the DSP has won the bid for its advertisement placed by the advertiser on behalf of the merchant (such as merchant 106) during the RTB process. The sequence flow begins at step 408.

Initially, when a user such as a user 104 clicks on a webpage, i.e., logons to the webpage published by a publisher (i.e., an entity who owns the webpage and wishes to generate revenue through Ad placement on the webpage), the RTB mechanism activates and the real-time bidding takes place at the AEP 404. During this bidding process, the SSP 406 provides the DSP with the IP address and the cookies for the user 104. Using these cookies and IP addresses, the DSP identifies the user 104 and accesses the relevant information it has on the user 104 from its advertisement and user database 122. Further, the DSP 402 assigns a first user ID (e.g., ABCDE) to the user 104 at 408.

At 410, the DSP 402 facilitates the transmission of a targeted Ad to the AEP 404. More specifically, the advertisers associated with the DSP 402 utilize the said relevant information to decide what ads should be shown and eventually bid for that ad slot for the user 104. Assuming that the bid is successful, the DSP 402 transmits the targeted Ad to the AEP 404.

At 412, the AEP 404 facilitates the transmission of the targeted Ad to the SSP 406.

At 414, the SSP 406 facilitates the targeted Ad to be displayed within the Ad slot on the webpage being viewed by the user 104 on an electronic device such as electronic device 108 of the user 104. More specifically, the SSP 406 transmits the targeted Ad to the publisher's webpage.

Now if the user 104 is interested in the goods, products, and/or services being advertised on the webpage, at 416, the user 104 may click on the targeted Ad being displayed within the webpage to complete a payment transaction through a payment card associated with the user 104 for purchasing goods, products, and/or services offered by the merchant 106 through the targeted Ad. For instance, the user 104 may complete the payment transaction through a payment gateway associated with the server system 200 or the payment server 134.

At 418, the server system 200 facilitates the payment transaction between the user 104 and the merchant 106. The server system 200 may facilitate the issuer server 110 associated with the payment card of the user 104 to authenticate and authorize the payment transaction with the merchant 106 associated with the acquirer server 112.

At 420, upon settlement or completion of the payment transaction, the server system 102 stores the transaction-related information associated with the payment transaction performed between the user 104 and the merchant 106 through the payment card within the historical transaction dataset 220. The historical transaction dataset 220 may be stored within the database 204 associated with the server system 200. In some instances, the transaction-related information may include transaction time, transaction amount, transaction date, the IP address of the user 104, PAN of the user 104 (e.g., XXXX XXXX XX XXXX), MCC of the merchant 106, merchant name, and so on.

At the same or near the same time, the merchant 106 transmits an advertisement-linked transaction successful message to the SSP 406 at 422. In an instance, an API message or an XML message may be used to transmit the advertisement-linked transaction successful message.

At 424, SSP 406 transmits the advertisement-linked transaction information about the successful conversion of the targeted Ad to the AEP 404. The advertisement-linked transaction information may include an Internet Protocol (IP) of the user, merchant information, transaction amount, transaction time of the advertisement-linked transaction, and the like.

At 426, the AEP 404 transmits the advertisement-linked transaction information to the DSP 402.

At 428, the DSP 402 updates its user information in the Advertisement and user database 122. More specifically, the DSP 402 stores the advertisement-linked transaction information alongside the cookies associated with the first user ID within the Advertisement and user database 122.

At 430, the DSP 402 transmits the user registration request to the server system 200. The user registration request may include at least the first user ID and the advertisement-linked transaction information.

At 432, the server system 200 identifies the user 104 from a plurality of users based on the transaction information using the advertisement-linked transaction information. More specifically, the server system 200 compares transaction information from the advertisement-linked transaction information with its historical transaction dataset 220 to identify the user along with its PAN (i.e., XXXX XXXX XX XXXX)

At 434, check if the PAN of the user 104 is linked to an existing user ID, if not then the server system 200 links the first user ID to the PAN of the user 104. For instance, the server system 200 links PAN i.e., XXXX XX XX XXX with the first user ID, i.e., ABCDE. It is noted that the alternative scenario for operation 434 is described later on.

Now, it is assumed that user 104 has deleted or reset their cookies or IP address, thus for any subsequent Ad delivery the DSP 402 has to assume that the user 104 is a new user thus, the DSP 402 will be bound to repeat the operations from operation 408 to operation 428. During these operations, the DSP 402 will generate a new user ID for the user 104, termed as the second user ID (e.g., FGHIJ), and new advertisement-linked transaction information termed as advertisement-linked second transaction information for the sake of explanation.

Then, at 436, the DSP 402 transmits another user registration request (called a new user registration request for the sake of explanation) to the server system 200. The new user registration request may include at least the first user ID and the advertisement-linked second transaction information.

At 438, the server system 200 identifies the user 104 again from the plurality of users based on the transaction information using the advertisement-linked second transaction information.

At 440, checks if the PAN of the user 104 is linked to an existing user ID, now since the PAN was previously linked with the first user ID, thus the server system 200 determines that the user 104 is an existing user.

At 442, the server system 200 transmits an existing user response message to the DSP 402.

At 444, the server system 200 links both the first user ID and the second user ID to the PAN of the user 104. In other words, both the first user ID, i.e., ABCDE, and the second user ID, i.e., FGHIJ are linked to PAN, i.e., XXXX XXXX XXXX XXXX.

As would be appreciated, by following operation 408 to operation 444, even if the user 104 deletes or resets their cookies/IP address multiple times, this change would still be captured by the server system 200. When the server system 200 informs the DSP 402 of this change, it can link new user IDs with older user IDs, thereby retaining detailed information about the user 104 irrespective of the change in the state of the current IP address or cookies of the user 104. This aspect allows the DSP 402 to enhance user identification and segmentation, thus simplifying the target audience selection process for the advertisers.

Figure 5:
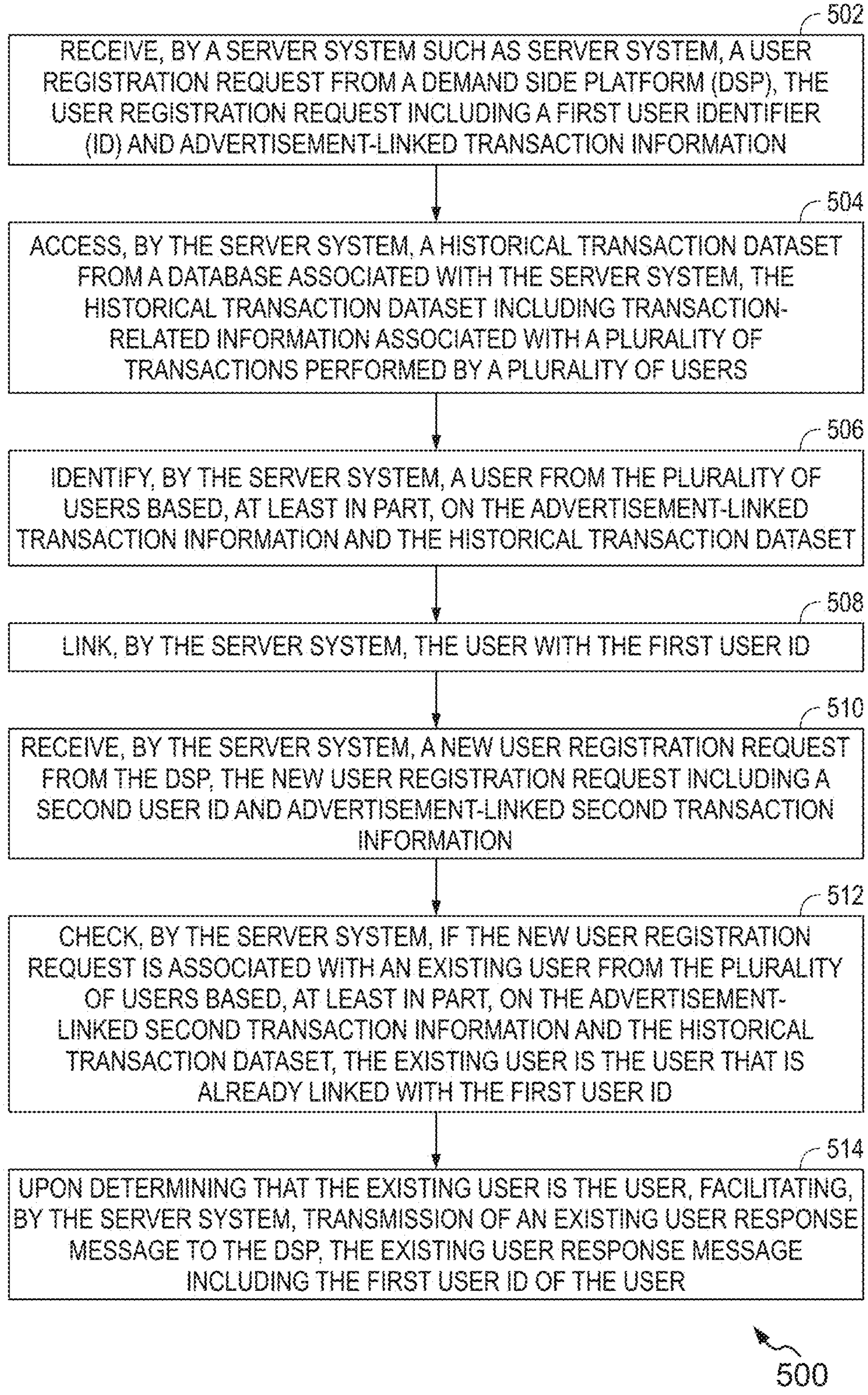
FIG. 5 illustrates a flow diagram depicting a method for enhancing user identification using transaction information, in accordance with an embodiment of the present disclosure.

FIG. 5 illustrates a flow diagram depicting a method 500 for enhancing user identification using transaction information, in accordance with an embodiment of the present disclosure. The method 500 depicted in the flow diagram may be executed by, for example, the server system 200. The sequence of operations of the method 500 may not be necessarily executed in the same order as they are presented. Further, one or more operations may be grouped and performed in the form of a single step, or one operation may have several sub-steps that may be performed in parallel or in a sequential manner. Operations of the method 500, and combinations of operations in the method 500 may be implemented by, for example, hardware, firmware, a processor, circuitry, and/or a different device associated with the execution of software that includes one or more computer program instructions. The plurality of operations is depicted in the process flow of the method 500. The process flow starts at operation 502.

At 502, the method 500 includes receiving, by a server system such as server system 200, a user registration request from a Demand Side Platform (DSP). Herein, the user registration request may include a first user identifier (ID) and advertisement-linked transaction information.

At 504, the method 500 includes accessing, by the server system 200, a historical transaction dataset from a database 204 associated with the server system 200. Herein, the historical transaction dataset may include transaction-related information associated with a plurality of transactions performed by a plurality of users.

At 506, the method 500 includes identifying, by the server system 200, a user from the plurality of users based, at least in part, on the advertisement-linked transaction information and the historical transaction dataset.

At 508, the method 500 includes linking, by the server system 200, the user with the first user ID.

At 510, the method 500 includes receiving, by the server system 200, a new user registration request from the DSP. Herein, the new user registration request may include a second user ID and advertisement-linked second transaction information.

At 512, the method 500 includes checking, by the server system 200, if the new user registration request is associated with an existing user from the plurality of users based, at least in part, on the advertisement-linked second transaction information and the historical transaction dataset. Herein, the existing user is the user that is already linked with the first user ID.

At 514, the method 500 includes upon determining that the existing user is the user, facilitating, by the server system 200, transmission of an existing user response message to the DSP, the existing user response message including the first user ID of the user.

Figure 6:
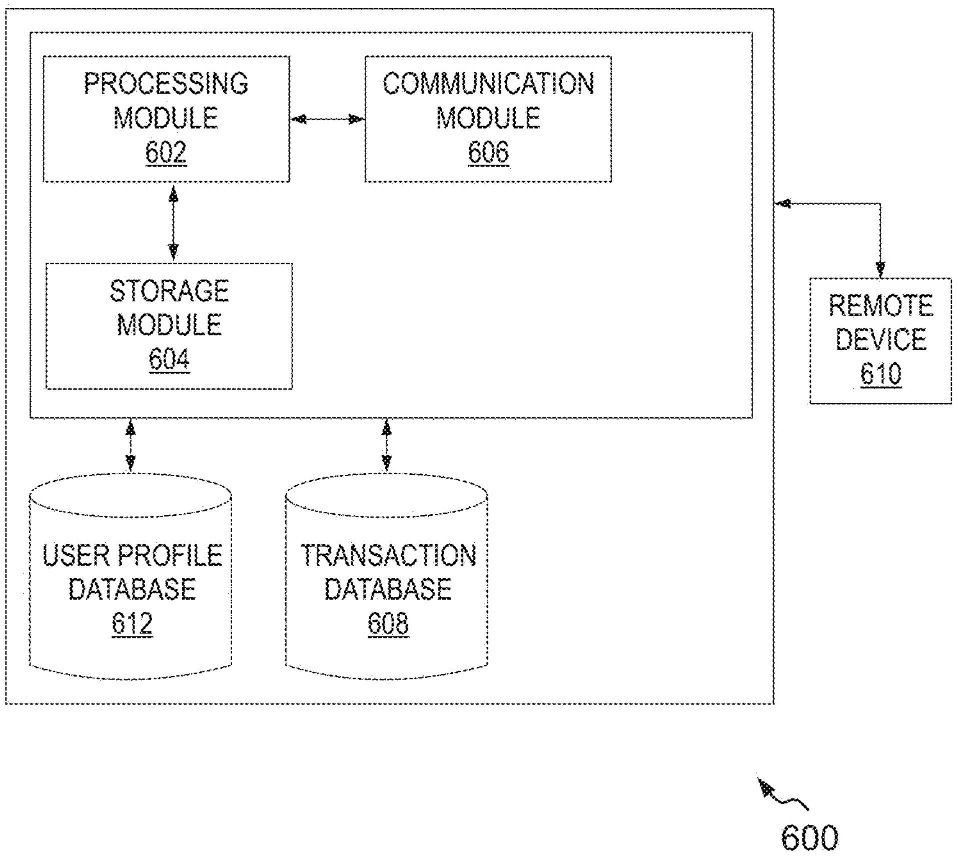
FIG. 6 illustrates a simplified block diagram of the acquirer server, in accordance with an embodiment of the present disclosure.

FIG. 6 illustrates a simplified block diagram of the acquirer server 600, in accordance with an embodiment of the present disclosure. The acquirer server 600 is an example of the acquirer server 112 of FIG. 1. The acquirer server 600 is associated with an acquirer bank/acquirer, in which a merchant may have an account. The acquirer server 600 includes a processing module 602 operatively coupled to a storage module 604 and a communication module 606. The components of the acquirer server 600 provided herein may not be exhaustive and the acquirer server 600 may include more or fewer components than those depicted in FIG. 6. Further, two or more components may be embodied in one single component, and/or one component may be configured using multiple sub-components to achieve the desired functionalities. Some components of the acquirer server 600 may be configured using hardware elements, software elements, firmware elements, and/or a combination thereof.

The storage module 604 is configured to store machine-executable instructions to be accessed by the processing module 602. Additionally, the storage module 604 stores information related to, the contact information of the merchant, bank account number, availability of funds in the account, payment card details, transaction details, and/or the like. Further, the storage module 604 is configured to store payment transactions.

In one embodiment, the acquirer server 600 is configured to store profile data (e.g., an account balance, a credit line, details of the merchant such as merchant 106, account identification information) in a transaction database 608. The details of the merchant 106 may include, but are not limited to, merchant name, age, gender, physical attributes, location, registered contact number, family information, alternate contact number, registered e-mail address, Merchant Category Code (MCC), merchant industry, merchant type, etc.

The processing module 602 is configured to communicate with one or more remote devices such as a remote device 610 using the communication module 606 over a network such as the network 130 of FIG. 1. The examples of the remote device 610 include the server system 102, the payment server 134, the plurality of issuer servers 110, or other computing systems of the acquirer server 600, and the like. The communication module 606 is capable of facilitating such operative communication with the remote devices and cloud servers using Application Program Interface (API) calls. The communication module 606 is configured to receive a payment transaction request performed by the user 104 of the plurality of users via the network 130. The processing module 602 receives payment card information, a payment transaction amount, and cardholder information from the remote device 610 (i.e., the payment server 134). The acquirer server 600 includes a user profile database 612 and the transaction database 608 for storing transaction data. The user profile database 612 may include information of the merchants. The transaction data may include, but is not limited to, transaction attributes, such as transaction amount, source of funds such as bank or credit cards, transaction channel used for loading funds such as POS terminal, transaction velocity features such as count and transaction amount sent in the past x days to a particular user, transaction location information, external data sources, and other internal data to evaluate each transaction.

Figure 7:
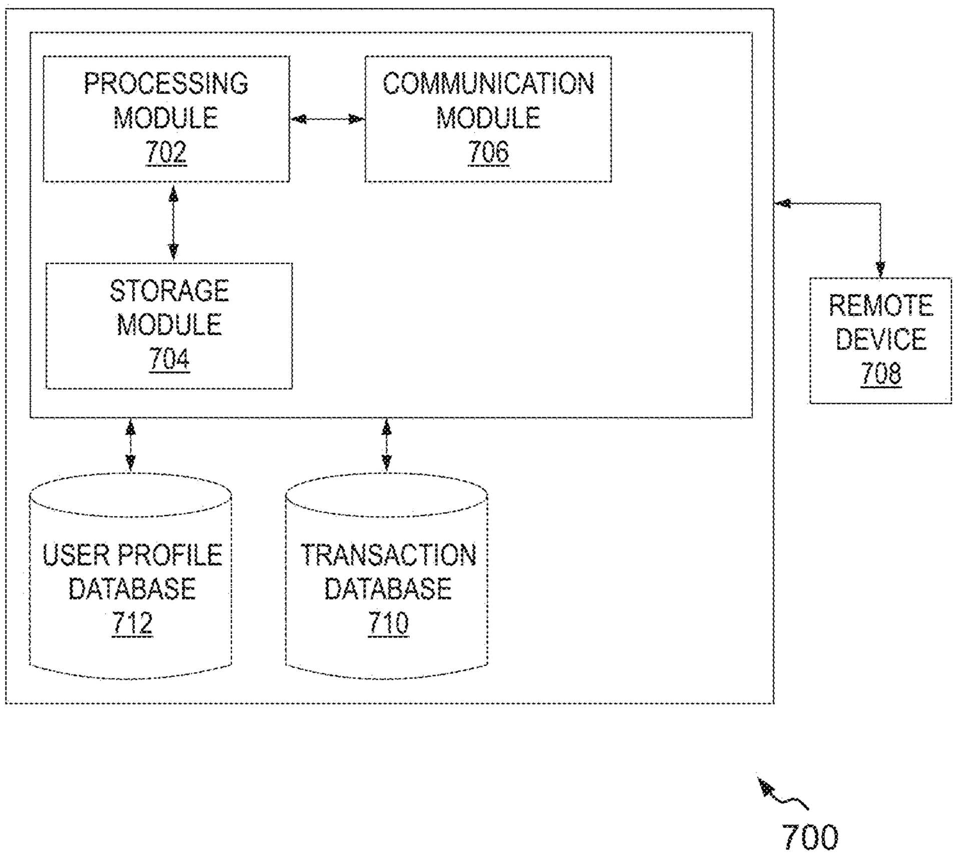
FIG. 7 illustrates a simplified block diagram of the issuer server, in accordance with an embodiment of the present disclosure.

FIG. 7 illustrates a simplified block diagram of the issuer server 700, in accordance with an embodiment of the present disclosure. The issuer server 700 is an example of the issuer server 110 of FIG. 1. The issuer server 700 is associated with an issuer bank/issuer, in which user may have an account, which provides a payment card. The issuer server 700 includes a processing module 702 operatively coupled to a storage module 704 and a communication module 706. The components of the issuer server 700 provided herein may not be exhaustive and the issuer server 700 may include more or fewer components than those depicted in FIG. 7. Further, two or more components may be embodied in one single component, and/or one component may be configured using multiple sub-components to achieve the desired functionalities. Some components of the issuer server 700 may be configured using hardware elements, software elements, firmware elements, and/or a combination thereof.

The storage module 704 is configured to store machine-executable instructions to be accessed by the processing module 702. Additionally, the storage module 704 stores information related to, the contact information of the user, a bank account number, availability of funds in the account, payment card details, transaction details, payment account details, and/or the like. Further, the storage module 704 is configured to store payment transactions.

In one embodiment, the issuer server 700 is configured to store profile data (e.g., an account balance, a credit line, details of the account holders, account identification information, payment card number, etc.) in a database. The details of the account holders may include, but are not limited to, name, age, gender, physical attributes, location, registered contact number, family information, alternate contact number, registered e-mail address, or the like of the account holders, etc.

The processing module 702 is configured to communicate with one or more remote devices such as a remote device 708 using the communication module 706 over a network such as the network 130 of FIG. 1. Examples of the remote device 708 include the server system 200, the payment server 134, the plurality of acquirer servers 112 or other computing systems of the issuer server 700. The communication module 706 is capable of facilitating such operative communication with the remote devices and cloud servers using API calls. The communication module 706 is configured to receive a payment transaction request performed by an account holder (e.g., the user 104 via the network 130. The processing module 702 receives payment card information, a payment transaction amount, customer information, and merchant information from the remote device 708 (e.g., the payment server 134). The issuer server 700 includes a transaction database 710 for storing transaction data. The transaction data may include, but is not limited to, transaction attributes, such as transaction amount, source of funds such as bank or credit cards, transaction channel used for loading funds such as POS terminal or ATM machine, transaction velocity features such as count and transaction amount sent in the past x days to a particular account holder, transaction location information, external data sources, and other internal data to evaluate each transaction. The issuer server 700 includes a user profile database 712 storing user profiles associated with the plurality of account holders.

The user profile data may include an account balance, a credit line, details of the account holders, account identification information, payment card number, or the like. The details of the user 104 may include, but are not limited to, name, age, gender, physical attributes, location, registered contact number, family information, alternate contact number, registered e-mail address, or the like of the user 104.

Figure 8:
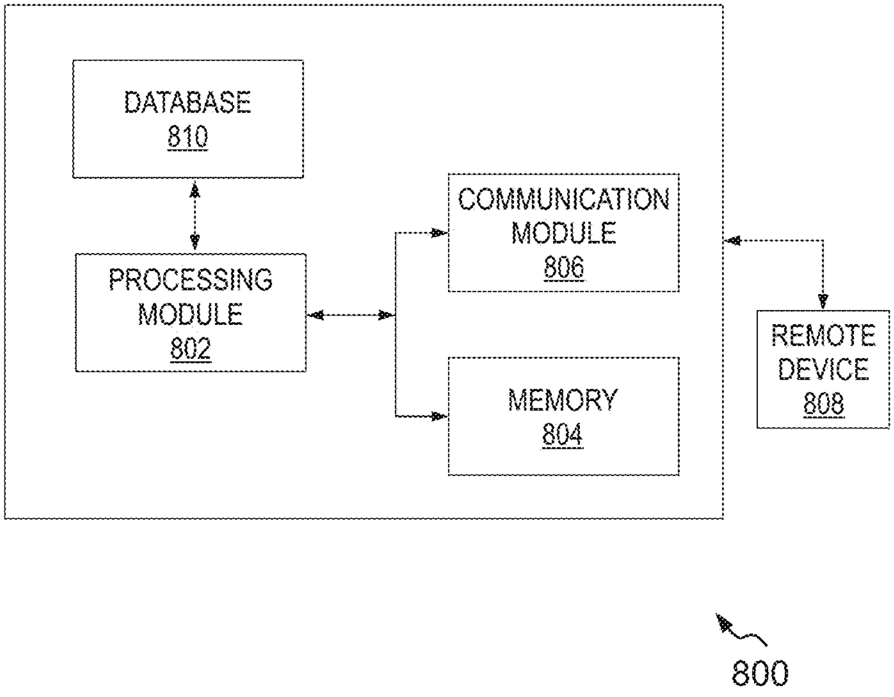
FIG. 8 illustrates a simplified block diagram of the payment server, in accordance with an embodiment of the present disclosure.

FIG. 8 illustrates a simplified block diagram of the payment server 800, in accordance with an embodiment of the present disclosure. The payment server 800 is an example of the payment server 134 of FIG. 1. The payment server 800 and the server system 200 may use the payment network 132 as a payment interchange network. Examples of payment interchange networks include, but are not limited to, Mastercard® payment system interchange network.

The payment server 800 includes a processing module 802 configured to extract programming instructions from a memory 804 to provide various features of the present disclosure. The components of the payment server 800 provided herein may not be exhaustive and the payment server 800 may include more or fewer components than that depicted in FIG. 8. Further, two or more components may be embodied in one single component, and/or one component may be configured using multiple sub-components to achieve the desired functionalities. Some components of the payment server 800 may be configured using hardware elements, software elements, firmware elements, and/or a combination thereof.

Via a communication module 806, the processing module 802 receives a request from a remote device 808, such as the issuer server 110, the acquirer server 112, or the server system 102. The request may be a request for conducting the payment transaction. The communication may be achieved through API calls, without loss of generality. The payment server 800 includes a database 810. The database 810 also includes transaction processing data such as issuer ID, country code, acquirer ID, and Merchant Identifier (MID), among others.

When the payment server 800 receives a payment transaction request from the acquirer server 112 or a payment terminal (e.g., IoT device), the payment server 800 may route the payment transaction request to an issuer server (e.g., the issuer server 110). The database 810 stores transaction identifiers for identifying transaction details such as transaction amount, IoT device details, acquirer account information, transaction records, merchant account information, and the like.

In one example embodiment, the acquirer server 112 is configured to send an authorization request message to the payment server 800. The authorization request message includes, but is not limited to, the payment transaction request.

The processing module 802 further sends the payment transaction request to the issuer server 110 for facilitating the payment transactions from the remote device 808. The processing module 802 is further configured to notify the remote device 808 of the transaction status in the form of an authorization response message via the communication module 806. The authorization response message includes, but is not limited to, a payment transaction response received from the issuer server 110. Alternatively, in one embodiment, the processing module 802 is configured to send an authorization response message for declining the payment transaction request, via the communication module 806, to the acquirer server 112. In one embodiment, the processing module 802 executes similar operations performed by the server system 200, however, for the sake of brevity, these operations are not explained herein.

The disclosed method with reference to FIGS. 4 and 5, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means include, for example, the Internet, the World Wide Web (WWW), an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, Complementary Metal Oxide Semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, Application Specific Integrated Circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause the processor or the computer to perform one or more operations. A computer-readable medium storing, embodying, or encoded with a computer program, or similar language, may be embodied as a tangible data storage device storing one or more software programs that are configured to cause the processor or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media. Examples of non-transitory computer-readable media include magnetic storage media (such as floppy disks, magnetic tapes, hard disk drives, etc.), optical magnetic storage media (e.g. magneto-optical disks), Compact Disc Read-Only Memory (CD-ROM), Compact Disc Recordable (CD-R), compact disc rewritable (CD-R/W), Digital Versatile Disc (DVD), BLU-RAY® Disc (BD), and semiconductor memories (such as mask ROM, programmable ROM (PROM), (erasable PROM), flash memory, Random Access Memory (RAM), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:

receiving, by a server system, a user registration request from a Demand Side Platform (DSP), the user registration request comprising a first user identifier (ID) and advertisement-linked transaction information;

accessing, by the server system, a historical transaction dataset from a database associated with the server system, the historical transaction dataset comprising transaction-related information associated with a plurality of transactions performed by a plurality of users;

identifying, by the server system, a user from the plurality of users based, at least in part, on the advertisement-linked transaction information and the historical transaction dataset, wherein identifying the user comprises comparing, by the server system, the advertisement-linked transaction information with the transaction-related information to select the user from the plurality of users;

linking, by the server system, the user with the first user ID;

receiving, by the server system, a new user registration request from the DSP, the new user registration request comprising a second user ID and advertisement-linked second transaction information;

determining, by the server system, that the new user registration request is associated with an existing user from the plurality of users based, at least in part, on the advertisement-linked second transaction information and the historical transaction dataset;

based on the determining, identifying that the existing user is the user that is already linked with the first user ID; and upon identifying that the existing user is the user, causing the server system to transmit an existing user response message to the DSP, the existing user response message comprising the first user ID of the user.

2. The computer-implemented method as claimed in claim 1, further comprising:

linking a first user profile associated with the first user ID to a second user profile associated with the second user ID, the first user profile comprising one or more of: older cookie data, older browser history, and older IP address, the second user profile comprising one or more of newer cookie data, newer browser history, and newer IP address;

based on the linking of the first user profile and the second user profile, generating a combined user profile of the user; and creating and serving targeted advertisements for the user using the combined user profile.

3. The computer-implemented method as claimed in claim 1, wherein linking the user with the first user ID, comprises:

determining, by the server system, a user Permanent Account Number (PAN) of the user based, at least in part, on the transaction-related information; and linking, by the server system, the user PAN of the user with the first user ID.

4. The computer-implemented method as claimed in claim 1, wherein checking if the new user registration request is associated with the existing user comprises:

identifying, by the server system, a subsequent user from the plurality of users based, at least in part, on the advertisement-linked second transaction information and the historical transaction dataset;

determining, by the server system, that a subsequent user PAN is linked with an existing user ID; and upon determining that the subsequent user PAN is linked with the first user ID, determining, by the server system, that the existing user is the user.

5. The computer-implemented method as claimed in claim 1, further comprising:

upon determining that the existing user does not exist, facilitating, by the server system, transmission of a registration successful response message to the DSP.

6. The computer-implemented method as claimed in claim 1, further comprising:

linking, by the server system, the user with the second user ID.

7. The computer-implemented method as claimed in claim 1, further comprising:

extracting, by the server system, a plurality of user transactions from the plurality of transactions based, at least in part, on the transaction-related information, the plurality of user transactions indicating transactions performed by the user;

generating, by the server system, a spending behavior profile of the user based, at least in part, on the plurality of user transactions; and facilitating, by the server system, transmission of the spending behavior profile of the user and the first user ID to the DSP.

8. The computer-implemented method as claimed in claim 1, wherein the advertisement-linked transaction information comprises at least an Internet Protocol (IP) of the user, merchant information, transaction amount, and transaction time of an advertisement-linked transaction.

9. The computer-implemented method as claimed in claim 1, wherein the user performs an advertisement-linked transaction with a merchant upon clicking on an advertisement generated by the DSP.

10. The computer-implemented method as claimed in claim 1, wherein the DSP is configured to generate the first user ID and the second user ID.

11. The computer-implemented method as claimed in claim 1, wherein the server system is a payment server associated with a payment network.

12. A server system, comprising:

a communication interface;

a memory comprising executable instructions; and a processor communicably coupled to the communication interface and the memory, the processor configured to cause the server system to at least:

receive a user registration request from a Demand Side Platform (DSP), the user registration request comprising a first user identifier (ID) and advertisement-linked transaction information;

access a historical transaction dataset from a database associated with the server system, the historical transaction dataset comprising transaction-related information associated with a plurality of transactions performed by a plurality of users;

identify a user from the plurality of users based, at least in part, on the advertisement-linked transaction information and the historical transaction dataset, wherein identifying the user comprises comparing the advertisement-linked transaction information with the transaction-related information to select the user from the plurality of users;

link the user with the first user ID;

receive a new user registration request from the DSP, the new user registration request comprising a second user ID and advertisement-linked second transaction information;

determine that the new user registration request is associated with an existing user from the plurality of users based, at least in part, on the advertisement- linked second transaction information and the historical transaction dataset;

based on the determining, identify that the existing user is the user that is already linked with the first user ID; and upon identifying that the existing user is the user, cause to transmit an existing user response message to the DSP, the existing user response message comprising the first user ID of the user.

13. The server system as claimed in claim 12, the server system is further caused at least to:

link a first user profile associated with the first user ID to a second user profile associated with the second user ID, the first user profile comprising one or more of: older cookie data, older browser history, and older IP address, the second user profile comprising one or more of newer cookie data, newer browser history, and newer IP address;

based on the linking of the first user profile and the second user profile, generate a combined user profile of the user; and serve targeted advertisements to the user using the combined user profile.

14. The server system as claimed in claim 12, wherein to link the user with the first user ID, the server system is further caused at least to:

determine a user Permanent Account Number (PAN) of the user based, at least in part, on the transaction-related information; and link the user PAN of the user with the first user ID.

15. The server system as claimed in claim 12, wherein to check if the new user registration request is associated with the existing user, the server system is further caused at least to:

identify a subsequent user from the plurality of users based, at least in part, on the advertisement-linked second transaction information and the historical transaction dataset;

determine that a subsequent user PAN is linked with an existing user ID; and upon determining that the subsequent user PAN is linked with the first user ID, determine that the existing user is the user.

16. The server system as claimed in claim 12, wherein the server system is further caused at least to:

upon determining that the existing user does not exist, facilitate transmission of a registration successful response message to the DSP.

17. The server system as claimed in claim 12, wherein the server system is further caused at least to:

link the user with the second user ID.

18. The server system as claimed in claim 12, wherein the server system is further caused at least to:

extract a plurality of user transactions from the plurality of transactions based, at least in part, on the transaction-related information, the plurality of user transactions indicating transactions performed by the user;

generate a spending behavior profile of the user based, at least in part, on the plurality of user transactions; and facilitate transmission of the spending behavior profile of the user and the first user ID to the DSP.

19. The server system as claimed in claim 12, wherein the advertisement-linked transaction information comprises at least an Internet Protocol (IP) of the user, merchant information, transaction amount, and transaction time of an advertisement-linked transaction.

20. A non-transitory computer-readable storage medium comprising computer-executable instructions that, when executed by at least a processor of a server system, cause the server system to perform a method comprising:

receiving a user registration request from a Demand Side Platform (DSP), the user registration request comprising a first user identifier (ID) and advertisement-linked transaction information;

accessing a historical transaction dataset from a database associated with the server system, the historical transaction dataset comprising transaction-related information associated with a plurality of transactions performed by a plurality of users;

identifying a user from the plurality of users based, at least in part, on the advertisement- linked transaction information and the historical transaction dataset, wherein identifying the user comprises comparing the advertisement-linked transaction information with the transaction- related information to select the user from the plurality of users;

linking the user with the first user ID;

receiving a new user registration request from the DSP, the new user registration request comprising a second user ID and advertisement-linked second transaction information;

determining that the new user registration request is associated with an existing user from the plurality of users based, at least in part, on the advertisement-linked second transaction information and the historical transaction dataset;

based on the determining, identifying that the existing user is the user that is already linked with the first user ID;

upon identifying that the existing user is the user, causing to transmit an existing user response message to the DSP, the existing user response message comprising the first user ID of the user.

* * * * *